United States Patent
Moritz et al.

(10) Patent No.: US 6,655,636 B1
(45) Date of Patent: Dec. 2, 2003

(54) PRODUCT WRAPPING INCORPORATING AIR DRAG DEVICE

(75) Inventors: Elan Moritz, Lynn Haven, FL (US); Helmut Portmann, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/134,849

(22) Filed: Apr. 29, 2002

(51) Int. Cl.⁷ .................................................. B64D 1/08

(52) U.S. Cl. ............................ 244/137.1; 244/138 R; 244/147

(58) Field of Search .......................... 244/137.1, 137.3, 244/142, 147, 148, 138 R, 139, 140, 152

(56) References Cited

U.S. PATENT DOCUMENTS

| | | | | |
|---|---|---|---|---|
| 3,558,005 A | * | 1/1971 | Crabtree et al. | 221/90 |
| 3,589,653 A | * | 6/1971 | Slater | 244/145 |
| 4,342,437 A | * | 8/1982 | Farinacci | 244/137.1 |
| 4,607,813 A | * | 8/1986 | Jeswine | 244/145 |
| 4,993,667 A | * | 2/1991 | Uotila | 244/142 |
| 5,202,177 A | * | 4/1993 | Kamper | 428/257 |
| 5,816,535 A | * | 10/1998 | Underwood, Jr. et al. | 244/137.3 |
| 6,056,241 A | * | 5/2000 | Kasher | 244/145 |
| 6,241,190 B1 | * | 6/2001 | Lunsford et al. | 244/137.3 |

* cited by examiner

Primary Examiner—Galen L. Barefoot
(74) Attorney, Agent, or Firm—Harvey A. Gilbert; Donald G. Peck

(57) ABSTRACT

A system is provided for slowing the speed of a product released into the air from an aircraft. A flexible material wrapped about a product includes a tethered portion thereof that is collapsible against the product prior to release thereof from the aircraft. The tethered portion expands to form an air drag device after the product is released from the aircraft.

22 Claims, 5 Drawing Sheets

PRODUCT WRAPPING INCORPORATING AIR DRAG DEVICE

ORIGIN OF THE INVENTION

The invention described herein was made in the performance of official duties by a employees of the Department of the Navy and may be manufactured, used, licensed by or for the Government for any governmental purpose without payment of any royalties thereon.

FIELD OF THE INVENTION

The invention relates generally to in-air product dispensing operations, and more particularly to a product wrapping that incorporates an air drag device to slow the product's descent when it is released into an aircraft's slipstream.

BACKGROUND OF THE INVENTION

Currently, products such as food packets, sand bags, supplies and other materials that must be air dropped or air-delivered for military or civilian (e.g., disaster relief, emergency response, etc.) purposes are released directly into a delivering aircraft's slipstream. The weight (e.g., on the order of 10–100 pounds or more) of these products can make them a substantial hazard to personnel on the ground. Further, if some or many of the products are damaged upon impact with the ground, a mission's goal may be compromised.

SUMMARY OF THE INVENTION

Accordingly, it is an object of the present invention to provide an air drag device that can slow a product's descent when the product is released into an aircraft's slipstream.

Another object of the present invention is to provide a product wrapping that incorporates an air drag device to slow the product's descent when it is released into a relatively moving airstream.

Still another object of the present invention is to provide a product wrapping that incorporates an air drag device that slows a product after it has been dispensed into the air from an aircraft and that is easily removed from the product wrapping after the product has reached the ground.

Other objects and advantages of the present invention will become more obvious hereinafter in the specification and drawings.

In accordance with the present invention, a system is provided for slowing the speed of a product released into the air from an aircraft. A flexible material wrapped about a product includes a tethered portion thereof that is collapsible against the product prior to release thereof from the aircraft and expandable to form an air drag device after the product is released from the aircraft. The tethered portion can be made from a variety of plastics with or without fiber reinforcements impregnated therein.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
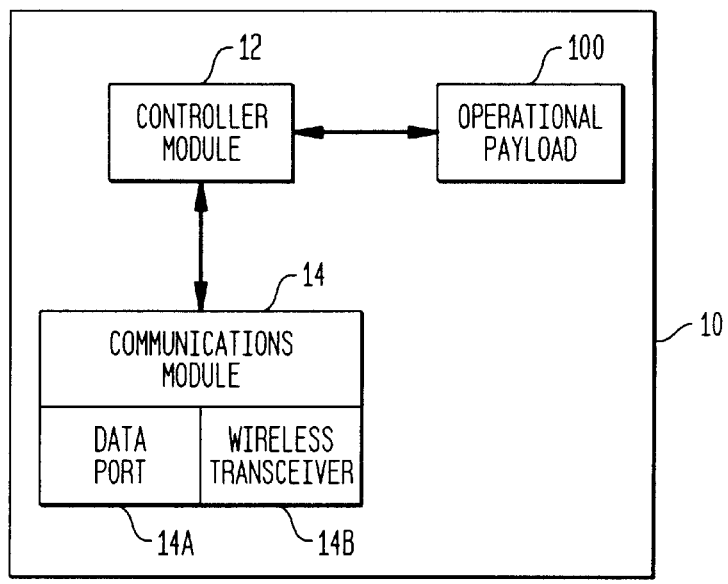
FIG. 1 is a schematic view of an unmanned system used for the delivery and control of an operational payload which, in the present invention, provides for the dispensing of products.

Referring now to the drawings, and more particularly to FIG. 1, a schematic view of an unmanned system for the delivery and control of an operational payload 100 is illustrated. This system is disclosed by applicants in a co-pending patent application entitled "STANDARDIZED CONTAINER PAYLOAD DELIVERY AND CONTROL SYSTEM", Navy Case No. 83610. The system includes a shipping container 10 with a controller module 12 and a communications module 14 mounted within shipping container 10. In terms of the present invention, operational payload 100 is representative of any type of system that involves the dispensing of items from shipping container 10. Dispensed items include military and non-military pre-packaged products such as materials and supplies, as well as products that are generated or assembled in shipping container 10 just prior to their being dispensed therefrom.

Figure 2:
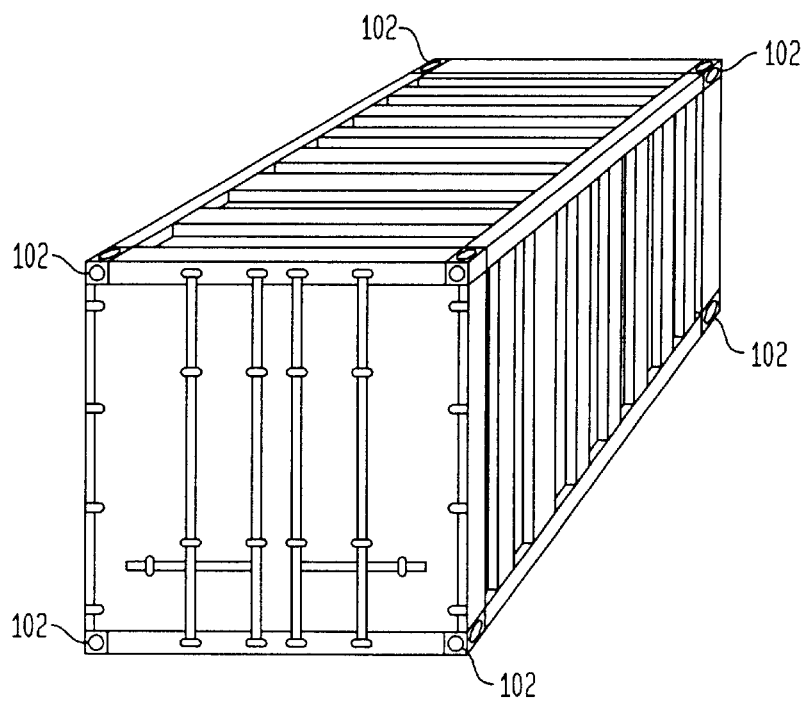
FIG. 2 is a perspective view of an ISO shipping container.

Shipping container 10 is any existing or specially-designed standardized shipping container having standardized outer dimensions and features to allow the use of existing handling, transportation and storage equipment/facilities that are used by a wide variety of military and commercial applications. For example, shipping container 10 could be a container constructed in accordance with standards set forth by the International Organization for Standardization or ISO as it is known. A standard ISO shipping container is illustrated in FIG. 2 where, as is known in the art, corner fittings 102 provide the means for handling the container. Corner fittings 102 could also provide for the coupling of adjacent shipping containers. Further, the standard outer dimensions of the ISO shipping container are already relied upon by both military and commercial organizations.

Controller module 12 is representative of application-specific hardware and software that cooperates to control the functions of operational payload 100. Such command and control of operational payload 100 can be pre-programmed into controller module 12 or can be provided in real time as will be explained further below. If pre-programmed, controller module 12 could be configured to trigger an operational sequence, for example, at a predetermined time, at a predetermined location, in response to a sensed condition, etc.

Communication with controller module 12 and operational payload 100 is made possible by communications module 14. Such communication could be limited to monitoring the functions of controller module 12 and/or the status of operational payload 100. Transfer of information from communications module 14 could occur through direct/ hardwire coupling thereto (e.g., via a data port 14A accessible on the exterior of shipping container 10) by a hand-held or other portable computer. Additionally or alternatively, communications module 14 could include equipment capable of transmitting monitored data to a remote location. In such cases, communications module 14 could include a wireless transceiver 14B for transmitting (e.g., via an antenna) the monitored data in a wireless fashion for receipt at a remote location. Further, wireless transceiver 14B could be used to transfer control of operational payload 100 to an external controller (not shown) should controller module 12 fail or for other reasons.

Wireless transceiver 14B could also serve as a receiver of instructions used to program controller module 12 in order to ultimately control the functions of operational payload 100. In this way, the present invention provides for the remote control of operational payload 100 in real time. Thus, shipping container 10 could be delivered to a destination with on-site operation of the payload being brought about in an "unmanned" fashion from a remote location.

Figure 3:
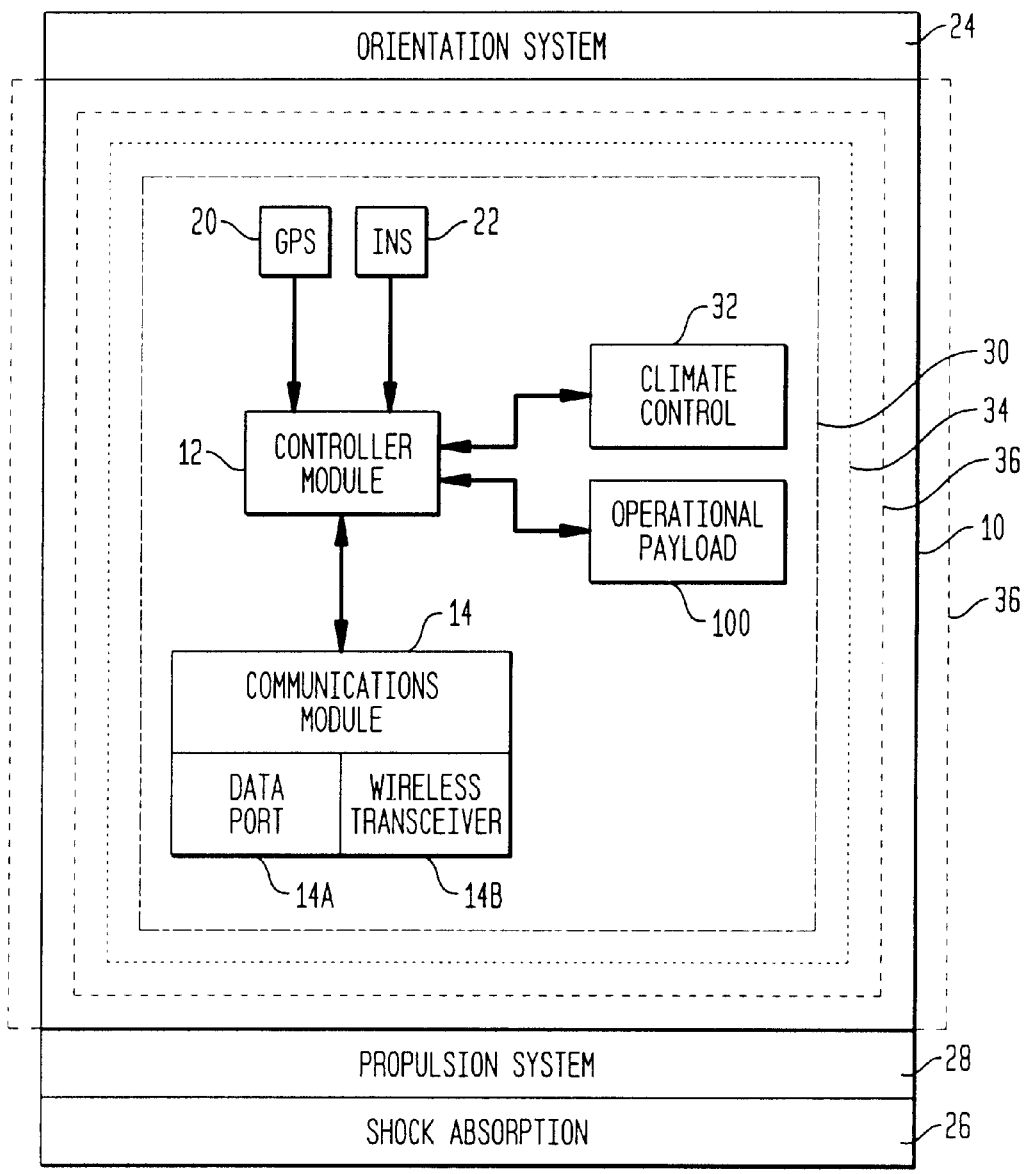
FIG. 3 is a schematic view of the unmanned system further equipped with a variety of positioning and protection features.

While FIG. 1 and the above description illustrate some basic elements of the present invention, additional features can be incorporated. Some of these features will now be described with the aid of FIG. 3 where all or any single one or combination of the illustrated and described features could be incorporated with the basic system illustrated in FIG. 1 depending on application requirements. Should a global position of shipping container 10 be required, such position information can be provided by either or both of a Global Positioning System (GPS) module 20 and an inertial navigation system (INS) module 22 which supply the determined position information to controller module 12.

In applications requiring the release of shipping container 10 in a fluid environment such as the air or water, it may be necessary to couple an orientation system 24 to shipping container 10. Orientation system 24 represents any apparatus or system designed to place shipping container 10 in a preferred orientation once it is released into a fluid environment. Accordingly, orientation system 24 could include, but is not limited to, parachutes, control surfaces and ballast devices. A shock absorption system 26 may also be required to absorb impact shocks when shipping container 10 hits the ground. Such shock absorption could include parachutes, springs, air cushions, etc.

Some applications may require shipping container 10 to travel short distances or be maneuvered at its delivery destination. For these applications, a propulsion system 28 can be provided and coupled to shipping container 10. Control for propulsion system 28 would be governed by controller module 12.

Should any or all of controller module 12, communications module 14 and operational payload 100 be moisture sensitive, it may be necessary to waterproof the contents of shipping container 10. Such waterproofing is indicated by dot-dash line 30. Additionally, a climate control module 32 (e.g., air conditioning, heating, humidity, air pressure, etc.) can be provided in shipping container 10 and placed under the control of controller module 12. It may also be necessary to protect the contents of shipping container 10 from electromagnetic interference (EMI). Accordingly, EMI shielding can be provided as indicated by dotted line 34. Still further, it may be necessary to protect the contents of shipping container 10 from various shock and/or vibration forces. For example, if protection from incoming projectiles is a concern, armor can be provided about some or all of the interior and/or exterior of shipping container 10 as indicated by dashed lines 36.

Figure 4:
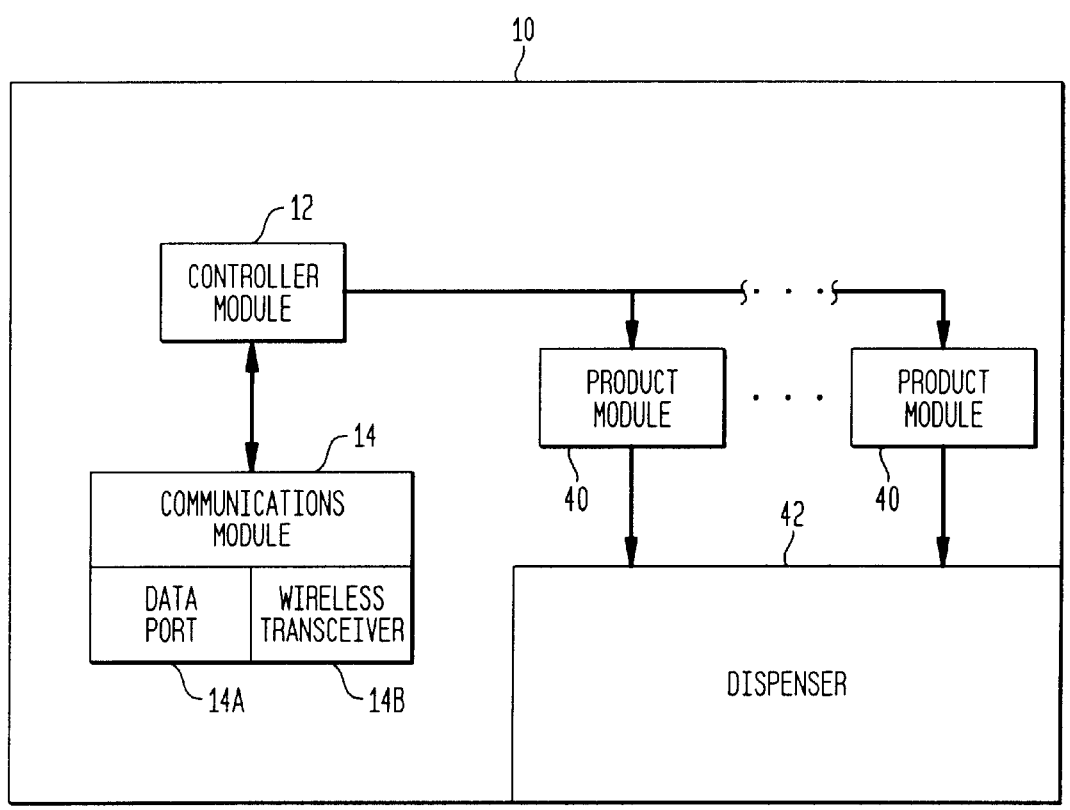
FIG. 4 is a schematic view of an unmanned system further equipped to manipulate and dispense products from a shipping container.

In the present invention, the operational payload provides for the dispensing of a wide variety of items. Accordingly, FIG. 4 illustrates the general features that must be incorporated with the basic FIG. 1 design in order to accomplish the dispensing tasks. One or more product modules 40, under the control of controller module 12, are provided in shipping container 10. Each of product modules 40 is capable of providing one or more products (not shown) to a dispenser 42 that expels the products from shipping container 10. Each of product modules 40 can be a stand-alone module that provides its products in a pre-packaged form when commanded to do so by controller module 12. Product modules 40 can also be configured to generate the products from a stored supply of raw materials when commanded by controller module 12. While the particular products provided by product modules 40 need not be the same, the products would typically be the same in terms of their outer dimensions and weight to simplify the design of dispenser 42.

As mentioned above, the general function of dispenser 42 is to expel the products it receives from shipping container 10. Dispenser 42 can be configured as either a "dumb" or "smart" functional element of the present invention. That is, in its "dumb" configuration, dispenser 42 would automatically dispense any product received from product modules 40. However, in its "smart" configuration, dispenser 42 would be controlled by controller module 12 to dispense its received products only when instructed to do so.

Figure 5:
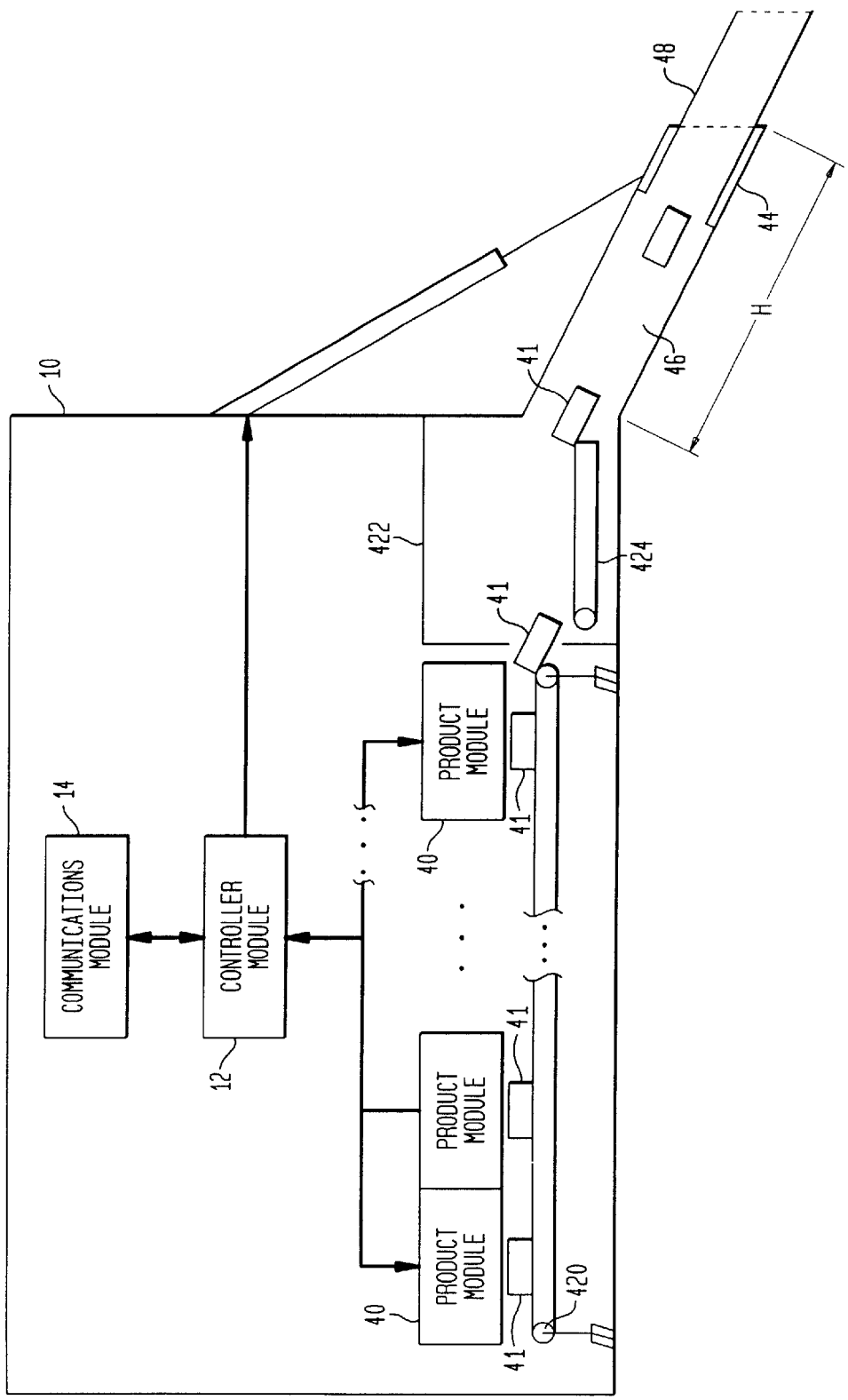
FIG. 5 is a schematic view of an unmanned system that provides for the controlled dispensing of pre-packaged products.

By way of example, FIG. 5 depicts an embodiment of the present invention for the dispensing of pre-packaged products. Each of product modules 40 is a magazine filled with pre-packaged products. Product modules 40 are distributed along a conveying system 420 which can be a motorized conveyor belt system, a motorized or gravity-fed roller wheel type of conveyor system, or a system of guides or chutes that utilize, for example, gravity or a vacuum to move products therealong. Regardless of its particular configuration, conveying system 420 could also be modularized to simplify its construction and repair. Accordingly, it is to be understood that the particular type of conveying system used by the present invention is not is not a limitation thereof.

Each of product modules 40 deposits its products 41 with conveying system 420 which transports them to their ultimate dispensing point. In the illustrated embodiment, products 41 are transported to one end of shipping container 10 where a dispensing magazine 422 receives products 41 and dispenses same. For example, dispensing magazine 422 can include one (or more) dispensing guide(s) 424 that receive each product 41 and eject it therefrom to begin the expulsion from shipping container 10.

To facilitate such expulsion, a door 44 of shipping container 10 can be configured as follows. Door 44 can be a motorized, hydraulic or otherwise mechanized door that either opens at a pre-programmed time or under the control of controller module 12 when expulsion of products 41 is to commence. Door 44 incorporates at least one guide channel 46. Door 44/guide channel 46 are configured such that when door 44 is opened as shown, guide channel 46 is aligned with dispensing guide 424. To take advantage of gravity, door 44 swings to a downward angle. In this way, each product 41 ejected from dispensing guide 424 slides under the force of gravity down guide channel 46. For applications involving the dispensing of products 41 in the air, guide channel 46 is typically an enclosed channel. In addition, if the height H of door 44 is not sufficient to define an optimal release position for products 41 (as may be the case for an in-air dispensing application), a guide extension 48 can be coupled to guide channel 46. For example, guide extension 48 could be fitted in guide channel 46 and configured to automatically slide to its extended position (as shown) when door 44 is fully opened.

For in-air dispensing applications where products 41 are of a substantial weight (e.g., on the order of 10–100 pounds or more), there may be concerns regarding safety of personnel on the ground and maintaining integrity of products 41 when they land on the ground. To address these concerns, each of products 41 can be specially wrapped as illustrated for a single product 41 in FIGS. 6 and 7. More specifically, product 41 has an outer wrapping 50 of a flexible material. Although not required, outer wrapping 50 generally will encompass the entirety of product 41 to protect same from dirt, humidity and/or water damage. Accordingly, outer wrapping 50 is generally made of an impermeable material such as any one of a variety of plastic materials without fiber reinforcement impregnated therein. Note that outer wrapping 50 can also be used to keep parts/components of product 41 from being lost during the dispensing process. Suitable wrapping materials and apparatus for wrapping same around product 41 are well known in the art.

Coupled to outer wrapping 50 is an assembly 52 that will function as an air drag device once product 41 is dispensed in the air from a moving aircraft. Assembly 52 is illustrated in its collapsed, pre-dispensed state in FIG. 6, and in its expanded, post-dispensed state in FIG. 7. Assembly 52 includes a sheet 54 of flexible material and one or more flexible tethers 56 coupled to sheet 54 and outer wrapping 50. For example, each of tethers 56 can be wrapped around and under product 41 for reasons that will be explained further below.

Figure 6:
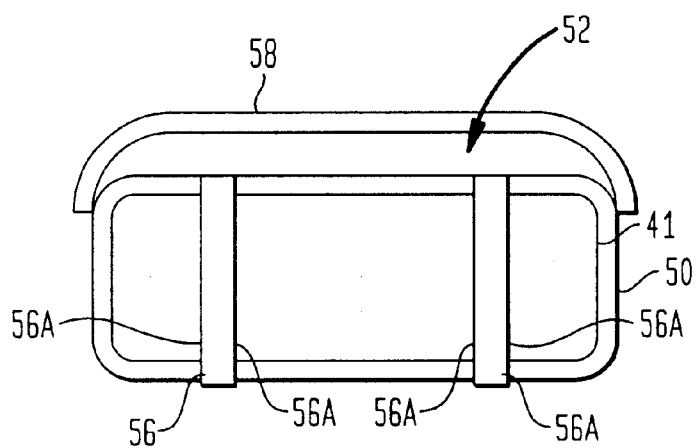
FIG. 6 is a schematic view of a product wrapped for dispensing into the air and is shown in its pre-dispensed configuration in accordance with the present invention.
Figure 7:
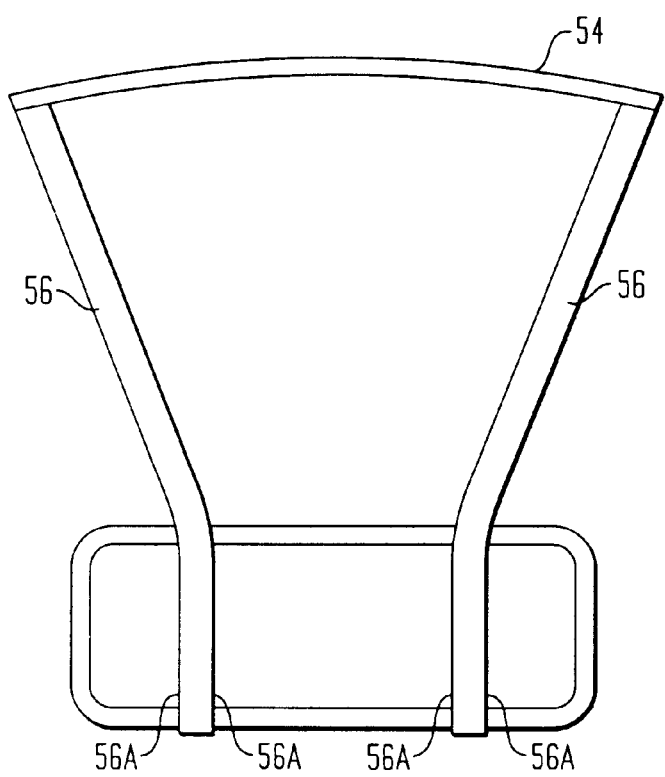
FIG. 7 is a schematic view of the product wrapped as shown in FIG. 6 after it has been dispensed into the air.

During the wrapping of product 41, sheet 54 and tethers 56 are collapsed against outer wrapping 50 as shown in FIG. 6. A low-tack tape 58 can be stretched over assembly 52 and attached to outer wrapping 50 to maintain assembly 52 in its collapsed state during pre-dispensing handling thereof. Once product 41 so-wrapped is released into a relatively moving air flow (as would be the case of product 41 so-wrapped were dispensed from shipping container 10 flown on-board an aircraft), assembly 52 opens to its post-dispensed state shown in FIG. 7. More specifically, as moving air gets under sheet 54, low-tack tape 58 fails as air pressure pushes upon sheet 54 causing it to expand and pull tethers 56 taught. Thus, sheet 54 acts as an air drag device (e.g., parachute) on product 41 as it descends to the ground. Additional support for product 41 is provided by wrapping each of tethers 56 around and under product 41 as shown.

Suitable materials for each of sheet 54 and tethers 56 include a variety of plastic materials which may have reinforcing fibers impregnated therein. The materials used for outer-wrapping 50, sheet 54 and tethers 56 can be the same or different without departing from the scope of the present invention.

In situations requiring quick recovery of each product 41 landing on the ground, it may be desirable to provide for the quick removal as assembly 52 without the use of any tools. To facilitate such quick removal, tethers 56 can be attached to outer wrapping 50 by means of quick release seams 56A, the particular choice of which is not a limitation of the present invention.

The advantages of the present invention are numerous. The product wrapping disclosed herein protects a product during its handling and descent through the air. The tethered portion of the product wrapping collapses easily against the product for pre-use storage and will open easily once placed in a relatively moving air flow such as an aircraft's slipstream. In one embodiment, quick removal of the tethered portion is provided for so that the cumbersome unfurled air drag device can be left behind using a minimum amount of effort once the product is on the ground.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for slowing the speed of a product released into the air from an aircraft, said system comprising a flexible material wrapped about a product, said flexible material including a tethered portion thereof that is collapsible against the product prior to release thereof from the aircraft and expandable to form an air drag device after the product is released from the aircraft.

2. A system as in claim 1 wherein said flexible material incorporates reinforcing fibers therein.

3. A system as in claim 1 wherein said flexible material is a plastic material.

4. A system as in claim 1 wherein said flexible material is a plastic material having reinforcing fibers incorporated therein.

5. A system as in claim 1 further comprising means for facilitating removal of said tethered portion.

6. A system for slowing the speed of a product released into the air from an aircraft, said system comprising:
    a first flexible material for wrapping about a product;
    a second flexible material; and
    at least one together coupling said second flexible material to said first flexible material, said second flexible material and said tether being collapsed against said first flexible material prior to the time that the product so-wrapped is released from the aircraft wherein said second flexible material separates from said first flexible material while remaining coupled thereto by said tether to form an air drag device after the product so-wrapped is released from the aircraft.

7. A system as in claim 6 wherein said second flexible material incorporates reinforcing fibers therein.

8. A system as in claim 6 wherein said second flexible material is a plastic material.

9. A system as in claim 6 wherein said second flexible material is a plastic material having reinforcing fibers incorporated therein.

10. A system as in claim 6 wherein said tether incorporates reinforcing fibers therein.

11. A system as in claim 6 wherein said tether is a plastic material.

12. A system as in claim 6 wherein said tether is a plastic material having reinforcing fibers incorporated therein.

13. A system as in claim 6 further comprising means for facilitating removal of said tether from said first flexible material.

14. A system as in claim 6 further comprising means for maintaining said second flexible material and said tether collapsed against said first flexible material prior to the time that the product so-wrapped is released from the aircraft.

15. A system for slowing the speed of a product released into the air from an aircraft, said system comprising:
- a first flexible material for wrapping about a product;
- a second flexible material;
- a plurality of tethers coupled to said first flexible material and said second flexible material; and
- means for maintaining said second flexible material and said plurality of tethers in a collapsed position against said first flexible material prior to the time that the product so-wrapped is released from the aircraft, said means failing after the product so-wrapped is released from the aircraft wherein said second flexible material separates from said first flexible material while remaining coupled thereto by said plurality of tethers to form an air drag device.

16. A system as in claim 15 wherein said second flexible material incorporates reinforcing fibers therein.

17. A system as in claim 15 wherein said second flexible material is a plastic material.

18. A system as in claim 15 wherein said second flexible material is a plastic material having reinforcing fibers incorporated therein.

19. A system as in claim 15 wherein each of said plurality of tethers incorporates reinforcing fibers therein.

20. A system as in claim 15 wherein each of said plurality of tethers is a plastic material.

21. A system as in claim 15 wherein each of said plurality of tethers is a plastic material having reinforcing fibers incorporated therein.

22. A system as in claim 15 further comprising means for facilitating removal of each of said plurality of tethers from said first flexible material.

* * * * *